US012366828B2

(12) United States Patent
Philippon et al.

(10) Patent No.: US 12,366,828 B2
(45) Date of Patent: Jul. 22, 2025

(54) MULTIFUNCTION CORRECTION DEVICE FOR A TIMEPIECE AND TIMEPIECE COMPRISING SUCH A MULTIFUNCTION CORRECTION DEVICE

(71) Applicant: ETA SA MANUFACTURE HORLOGÈRE SUISSE, Grenchen (CH)

(72) Inventors: David Philippon, Saint-Imier (CH); Roman Egli, Neuendorf (CH); Raphaël Courvoisier, Corcelles (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 407 days.

(21) Appl. No.: 17/986,499

(22) Filed: Nov. 14, 2022

(65) Prior Publication Data

US 2023/0195036 A1 Jun. 22, 2023

(30) Foreign Application Priority Data

Dec. 16, 2021 (EP) .................................... 21215204

(51) Int. Cl.
*G04B 19/23* (2006.01)
*G04B 3/04* (2006.01)

(52) U.S. Cl.
CPC ........... *G04B 19/235* (2013.01); *G04B 3/046* (2013.01)

(58) Field of Classification Search
None
See application file for complete search history.

(56) References Cited

U.S. PATENT DOCUMENTS 7,441,945 B2 * 10/2008 Laucella ................ G04B 3/048 368/190
8,371,745 B2 2/2013 Manni
2010/0187074 A1 7/2010 Manni
2016/0209863 A1 7/2016 Stringos
(Continued)

FOREIGN PATENT DOCUMENTS

CH 710 271 A2 4/2016
CH 714 602 A1 7/2019
EP 1 939 699 A1 7/2008
(Continued)

OTHER PUBLICATIONS

Wolfgang International, Engine Bolts (Year: 2020).*
European Search Report for EP 21 21 5204, dated Jun. 10, 2022.

*Primary Examiner* — Renee S Luebke
*Assistant Examiner* — Matthew Daniel Hwang
(74) *Attorney, Agent, or Firm* — Sughrue Mion, PLLC

(57) ABSTRACT

A multifunction correction device (100) for a case (2) of a timepiece including a horological movement (1) having at least one function corrector (10, 12) for carrying out various functions of activating, selecting, resetting and/or correcting a piece of information derived from the current time of the horological movement. A control member (130) is capable of moving in rotation about the axis of revolution (X-X) of a control stem (120) between a plurality of angular positions and a protrusion (123) is configured such that the rotation of the control member (130) modifies the angular position of the protrusion (123) about the axis of revolution (X-X) and relative to the horological movement (1).

17 Claims, 2 Drawing Sheets

(56) References Cited

U.S. PATENT DOCUMENTS

2019/0137938 A1 * 5/2019 Riedo ...................... G04B 3/02

FOREIGN PATENT DOCUMENTS

| | | | |
|---|---|---|---|
| EP | 2 469 358 | A2 | 6/2012 |
| JP | 51-126872 | A | 11/1976 |
| JP | 2006-24424 | A | 1/2006 |
| JP | 2016-136389 | A | 7/2016 |

* cited by examiner

MULTIFUNCTION CORRECTION DEVICE FOR A TIMEPIECE AND TIMEPIECE COMPRISING SUCH A MULTIFUNCTION CORRECTION DEVICE

CROSS REFERENCE TO RELATED APPLICATIONS

This application claims priority to European Patent Application No. 21215204.5 filed Dec. 16, 2021.

TECHNICAL FIELD OF THE INVENTION

The invention relates to a multifunction correction device for a timepiece allowing, for example, information displayed on a dial to be selected and/or modified by means of a single control member.

The invention further relates to a timepiece comprising such a multifunction correction device allowing, for example, information displayed on a dial to be selected and/or modified, for example to correct, engage or reset several functions derived from the current time.

TECHNOLOGICAL BACKGROUND

A timepiece, in particular a wristwatch, allows the user to know the current time. This current time can be corrected by exerting an action (for example by pulling) on the winding stem until a certain position for this corrective action is reached.

The wristwatch can also be used to display, correct, engage and reset functions derived from the current time, generally referred to as complications, such as a date, time zone or chronograph, etc.

For this purpose, correction devices must be incorporated into the middle of the case of the wristwatch to allow these ancillary functions to be controlled and/or corrected.

These correction devices can be of the corrector or push button type.

Push buttons generally comprise a control member of the push-piece type positioned outside the watch case middle and which is easily accessible to the user, the push buttons allowing the ancillary functions to be controlled and/or corrected without the user being required to use a tool.

Corrector buttons are typically miniature push buttons that are inset in the middle of the wristwatch and which can be operated via a small, and typically pointed, tool instead of a protruding push-piece that is easily accessible to and handled by the user. These corrector buttons are generally used for quick function corrections.

Some timepieces, and in particular watches, comprising a plurality of complications, offer their users a high number of functions that require multiplying the number of these correction devices on the case.

However, the multiplication of the number of correction devices in the middle poses layout problems and can lead to aesthetic problems, in particular for mid-range and top-range timepieces, where a sober and elegant appearance is sought.

The multiplication of the number of correction devices in the middle also creates sealing problems due to the multiplication of the number of openings that must be made in the watch case in order to integrate and mount the various correction means.

SUMMARY OF THE INVENTION

In this context, the invention aims to propose a solution to the previously mentioned drawbacks of the prior art, by proposing a multifunction correction device allowing at least two different functions to be selected, activated and/or modified, using the same correction device requiring a single opening in the watch case middle to be mounted.

To this end, the invention relates to a multifunction correction device for a case of a timepiece comprising a horological movement having at least a first function corrector and a second function corrector, each of the function correcting members making it possible, in particular, to activate, select, reset or correct a function of said horological movement, said multifunction correction device being configured to select and/or activate one of the function correcting members of the horological movement by means of a single control member comprised in the multifunction corrector device and which is accessible to the user from outside the case.

The multifunction correction device according to the invention further comprises:

- a cylindrical body configured to be made integral with said timepiece case;
- a control stem with an axis of revolution X-X, the control stem being capable of moving in translation within the cylindrical body, along the axis of revolution X-X;
- the control member being integral with said control stem, and capable of moving in rotation and in translation relative to the cylindrical body;
- characterised in that the rotation of the control member causes the control stem to rotate, about the axis of revolution X-X, between a first activation position positioning a protrusion of one end of the control stem such that it faces the first function corrector and a second activation position positioning said protrusion of said end of the control stem such that it faces the second function corrector;
- and in that a press exerted on the control member allows the protrusion of said end of the control stem to be brought into contact with the selected function corrector in order to activate, select, reset or correct the selected function of the horological movement.

Thanks to the invention, the user can easily select at least one function corrector of said horological movement that he/she wishes to activate, and adjust it when the push-piece is pressed.

Thus, the multifunction correction device according to the invention allows the number of openings to be made in the middle of the watch case to be minimised. As a result, the problems concerning sealing, layout and aesthetics are avoided by reducing the number of correction devices to be implanted in the middle.

It should be noted that the multifunction correction device according to the invention is a correction device that is different from a setting crown connected to the winding stem which procures a time setting function, and optionally allows the barrel to be wound. Thus, the multifunction correction device according to the invention is not connected to a winding stem, for winding a barrel, and does not allow the current time of the movement to be set.

According to the invention, a correction device is understood to be either a push button which typically has a protruding push-piece control member located outside the middle of the case of the timepiece, or a corrector button which typically has a correction control member integrated into the thickness of the middle and accessible to the user from the outside of the case, for example using a tool.

In addition to the features mentioned in the preceding paragraph, the multifunction correction device according to the invention can have one or more complementary features from among the following, considered either on an individual basis or according to any combination technically possible:

- for one of the angular positions of the control member, the protrusion of the end of the control stem is capable of being positioned facing a function corrector comprised in the horological movement, such that the correction device is capable of carrying out a function associated with the function corrector when the control member is pressed;
- for one of the angular positions of the control member, the protrusion of the end of the control stem is capable of being positioned facing a plurality of function correctors comprised in the horological movement, such that the correction device is capable of simultaneously carrying out a combination of functions associated with the function correctors when the control member is pressed;
- for one of the angular positions of the control member, the protrusion of the end of the control stem is inactive with respect to the horological movement when the control member is pressed;
- the horological movement comprises a first function corrector and a second function corrector, in a first angular position of the control member, the protrusion of the end of the control stem is able to be positioned facing the first function corrector and in a second angular position of the control member, the protrusion of the end of the control stem is able to be positioned facing the second function corrector, a press on the control member allowing the protrusion of said end of the control stem to be brought into contact with the selected function corrector in order to activate, select, reset or correct the function of the associated horological movement;
- the cylindrical body has the shape of a cylinder of revolution with an axis of revolution X-X;
- the control stem is coaxial with the cylindrical body;
- said multifunction correction device is a push button configured to be partially housed in a middle of said case, the control member being a push-piece;
- said multifunction correction device is a miniature corrector button configured to be fully integrated into the thickness of a middle of said case;
- the control member comprises a recess configured to receive a tool having a shape that is complementary to that of the recess;
- the multifunction correction device comprises a return member provided between the cylindrical body and the control member to ensure that the control member returns to a rest position;
- the protrusion of said end of the control stem protrudes from a plane perpendicular to the axis of revolution X-X;
- the protrusion of said end of the control stem is a half-moon shaped post;
- the device comprises an indexing member for indexing said plurality of angular positions of the control member;
- the indexing member is formed by an indexer comprising an indexing ball housed in an indexing frame carried by the control member;
- said indexer cooperates with housings made in the cylindrical body.

The invention further relates to a timepiece comprising a multifunction correction device according to the invention.

Advantageously, the timepiece comprises a case enclosing a horological movement comprising at least a first function corrector and a second function corrector, each function corrector allowing, in particular, a function derived from the current time to be displayed, corrected, selected, engaged or reset; said case having a middle comprising a housing in which a multifunction correction device according to the invention is mounted, the multifunction correction device having a plurality of angular positions for interacting with the first function corrector and/or the second function corrector of the horological movement.

Advantageously, the horological movement comprises a first function corrector and a second function corrector.

Advantageously, the first function corrector and the second function corrector are formed by superimposed pivoting levers.

Advantageously, the timepiece is a wristwatch.

Advantageously, the movement of the timepiece is a mechanical movement.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

In general and common to the various example embodiments which will be described hereinbelow, the multifunction correction device according to the invention allows at least one function corrector comprised in a horological movement to be selected and/or activated in order to directly or indirectly carry out various functions of activating, selecting, resetting and/or correcting information derived from the current time, by means of a single control member accessible to the user from outside the case.

The control member thus forms a user interface for controlling various functions associated with information derived from the current time comprised in a horological movement fitted inside a case.

Figure 1:
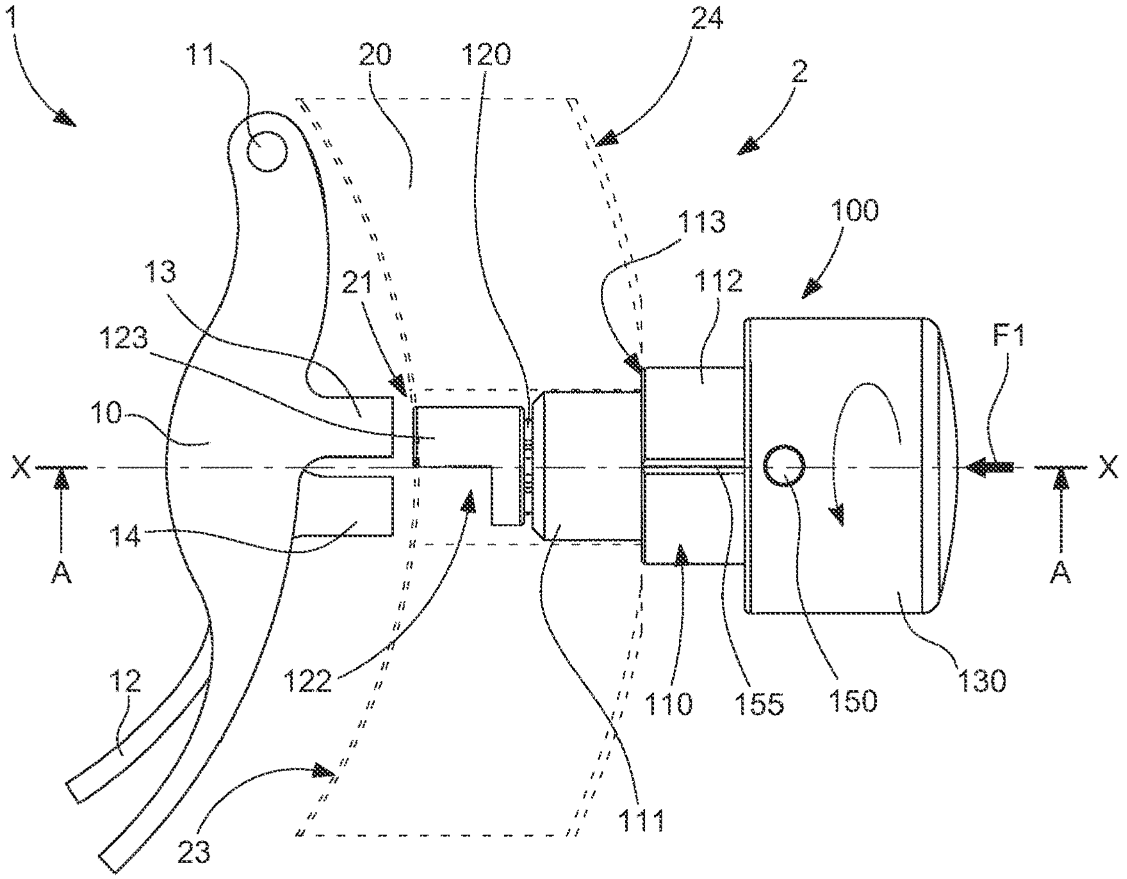
FIG. 1 shows a top view of a first example embodiment of a multifunction correction device according to the invention mounted in a watch case middle.

FIG. 1 shows a top view of a first example embodiment of a multifunction correction device 100 according to the invention mounted in a middle 20 of a timepiece case 2. With reference to FIG. 1, the middle 20 is shown transparently so that the multifunction correction device 100 can be viewed as a whole.

The timepiece case 2 is, for example, a wristwatch case.

The case 2 comprises a middle 20 with an outer face 24 and an inner face 23. The inner face 23 of the middle 20 delimits an internal space intended to receive a horological movement 1 (not shown in its entirety).

The horological movement 1 carries and drives means for displaying the current time and comprises in particular at least one complication for displaying at least one piece of information derived from the current time. To this end, the horological movement 1 comprises a plurality of function correctors 10, 12 allowing different functions to be carried out, directly or indirectly, for activating, selecting, resetting and/or correcting information derived from the current time.

In the example embodiment shown, the horological movement 1 comprises a first function corrector 10 and a second function corrector 12 allowing at least one function derived from the current time to be displayed, corrected, selected, engaged or reset. However, this representation is not limiting in nature.

For example, the horological movement 1 can comprise a complication such as a date, time zone, or chronograph, etc.

The function correctors 10, 12 are, for example, superimposed levers mounted such that they pivot about a pivot pin 11, as shown in particular in FIG. 1. However, other types of function correctors can be considered.

Figure 2:
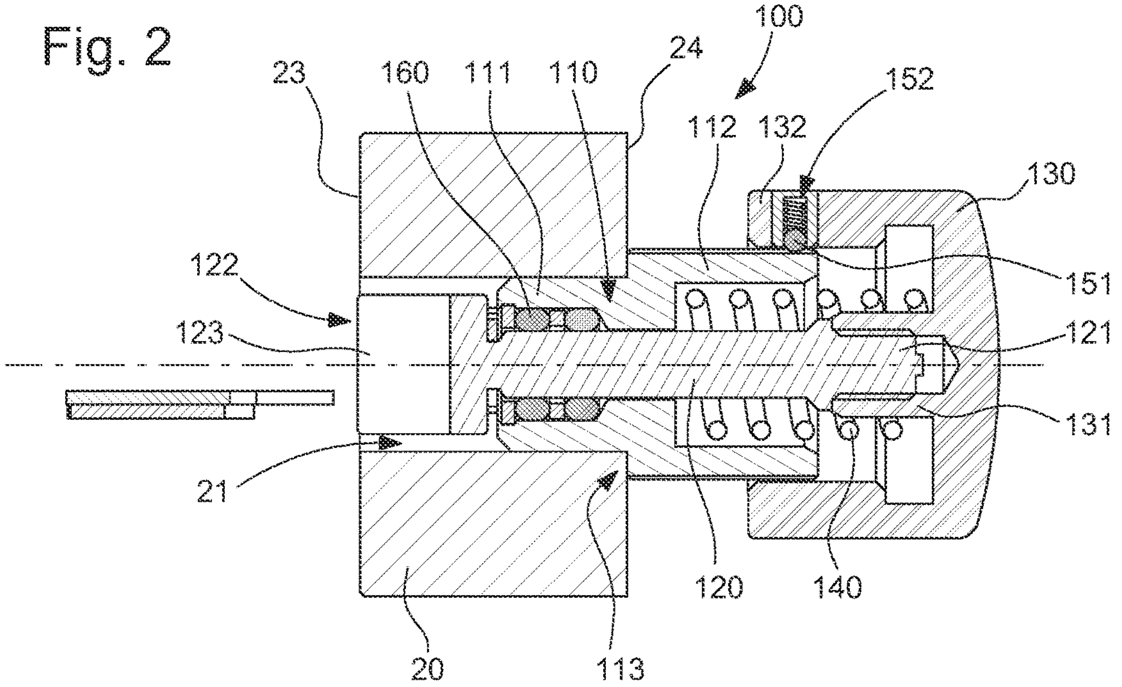
FIG. 2 shows a sagittal sectional view, along the axis A-A illustrated in FIG. 1, of the first example embodiment of the multifunction correction device according to the invention.

FIG. 2 shows a sagittal sectional view, along the axis A-A illustrated in FIG. 1, of the first example embodiment of the multifunction correction device 100 according to the invention.

In this first example embodiment, shown with reference to FIGS. 1 to 2, the multifunction correction device 100 is of the multifunction push button type.

The multifunction correction device 100 comprises a cylindrical body 110 configured to be made integral with the case 2, and more particularly to be mounted in the middle 20. The cylindrical body 110 extends along a longitudinal axis X-X and can have a circular external section or polygonal section.

In the example embodiment shown in FIGS. 1 to 2, the cylindrical body 110 is a cylinder of revolution with an axis of revolution that is coincident with the longitudinal axis X-X.

The cylindrical body 110 comprises a tubular part 111 and a head 112, the head 112 forming a first end of the cylindrical body 110.

The tubular part 111 can have a threaded portion for the assembly thereof to the middle 20 of the case 2. To this end, the middle 20 comprises a through-housing 21 comprising a tapped portion for mounting the multifunction correction device 100 according to the invention, by screwing.

According to an alternative embodiment, the tubular part 111 can be driven directly into the housing of the middle 20.

The head 112 is the part of the cylindrical body 110 that remains on the outside of the middle 20, i.e. on the side opposite the horological movement 1.

The head 112 has a larger diameter than the diameter of the tubular part 111, such that a shoulder 113 separates the head 112 from the tubular part 111. The shoulder 113 thus forms a bearing surface, which in this case is circular, or a stop surface, intended to come into contact with the outer face 24 of the middle 20 of the case 2 when the multifunction correction device 100 is mounted.

The multifunction correction device 100 further comprises a circular, cylindrical control stem 120 with an axis of revolution X-X.

The control stem 120 is configured to slide within the cylindrical body 110 along the axis X-X; and more particularly in an internal bore through the cylindrical body 110 provided to receive the control stem 120.

The control stem 120 is coaxial with the cylindrical body 110.

The control stem 120 is also capable of moving in rotation about the axis of revolution X-X within the cylindrical body 110. The control stem 120 is integral with a control member 130 that can be operated by the user from outside the case 2.

In this first example embodiment, the control member 130 is a push-piece. A push-piece is understood to mean the movable and protruding part of a user-operated push-button intended to be outside the middle of a case.

The control stem 120 comprises:

- a first end 121 facing the exterior of the case 2 and made integral with the control member 130, for example by driving in or screwing;
- a second end 122 facing the interior of the case 2 and intended to come into contact with a function corrector 10, 12 of the horological movement 1 and to actuate same when the user presses on the control member 130;
- a central portion forming the junction between the first end 121 and the second end 122.

In the example embodiment shown in FIGS. 1 and 2, the first end 121 of the control stem 120 has a threading made on a radially external face for screwing in the control member 130.

The second end 122 of the control stem 120 is intended to be positioned facing the horological movement 1 at different angular positions.

For example, one of the positions of the multifunction correction device 100 allows the second end 122 of the control stem 120 to be positioned facing a function corrector 10, 12. One of the positions of the multifunction correction device 100 allows the second end 122 of the control stem to be positioned facing a plurality of function correctors 10, 12. One of the positions of the multifunction correction device 100 allows the second end 122 of the control stem to be positioned not facing any function corrector of the horological movement.

The second end 122 of the control stem 120 has at least one protrusion, for example a post 123, protruding from a plane perpendicular to the axis of revolution X-X of the control stem 120.

In the example embodiment shown in FIGS. 1 and 2, the post 123 has a half-moon shape. The shape and the positioning of the post 123 at the end 122 facing the interior of the case 2 are configured according to the positioning of the various function correctors of the horological movement 1.

With function correctors 10, 12 positioned below the axis of revolution X-X of the control stem 120, angular positions can also be defined which allow the two function correctors 10, 12 or neither of the function correctors 10, 12 to be activated simultaneously.

According to the example embodiment shown in FIGS. 1 and 2, depending on the angular position of the control member 130, the post 123 can be positioned:

- facing a finger 13 of the first function corrector 10 (as shown in FIG. 1);
- facing a finger 14 of the second function corrector 12;
- facing the finger 13 of the first function corrector 10 and the finger 14 of the second function corrector 12 so as to actuate the two function correctors 10, 12 simultaneously;
- facing neither of the fingers 13, 14 of the function corrector 10, 12, so as not to carry out any function.

The second end 122 of the control stem 120 advantageously has an external diameter greater than the external diameter of the tubular portion 111 of the body 110. Thus, the second end 122 is also configured to form an abutment that comes to bear against the cylindrical body 110, and more particularly against the tubular part 111 of the cylindrical body 110, when returning to a rest position of the multifunction correction device 100.

Thus, the second end 122 forms means for ensuring a stable rest position for the control member 130.

The control member 130, of the push-piece type, has an overall capsule shape configured to slide concentrically around the cylindrical body 110. The control member 130 comprises an internal hollowing in which a shaft 131 is provided, having a tapped bore at the centre thereof to receive the first end 121 of the control stem 120.

The return to a rest position of the multifunction correction device 100 is ensured by a return member 140, for example a return spring, positioned between the cylindrical body 110, fixed in the middle 20, and the control member 130. Thus, the return member 140 tends to reposition the control member 130 and the control stem 120 to a rest position when the user is not pressing on the control member 130.

To this end, the cylindrical body 110 comprises an end cavity formed at the head 112 and configured to receive a first end of the return member 140 such that it bears thereagainst. The second end of the return member 140 comes to bear against an internal portion of the control member 130.

Thus, as seen previously, the selection of the function corrector 10, 12 of the movement to be operated is carried out by the user by modifying the angular position of the control member 130 relative to the cylindrical body 110.

Rotation of the control member 130 causes the control stem 120 integral therewith to rotate, and thus makes it possible to modify the position of the post 123 of the control stem 120 facing the horological movement, by modifying the angular position of the post 123, relative to the axis of revolution X-X.

Pressing the same control member 130 then brings the post 123 of the second end 122 of the control stem 120 into contact with the one or more fingers 13, 14 of the selected function correctors 10, 12 and operates same to allow one or more functions associated with the function correctors 10, 12 to be activated, selected, reset or corrected.

The multifunction correction device 100 according to the invention can further comprise an indexing member 150 for indicating to the user, for example in a sensitive manner, that the control member 130 is positioned in the right position to carry out the desired function, such as, for example, the activation of one or more function correctors 10, 12 of the horological movement 1. Thus, such an indexing member ensures that the post 123 is correctly positioned such that it is facing one or more function correctors 10, 12.

The indexing member 150 further allows a plurality of stable indexing positions of the control member 130 to be defined.

By way of example, the indexing member 150 is formed by an indexer comprising an indexing ball 151 and a spring housed in an indexing frame 152 carried by the control member 130, for example provided in a peripheral portion 132 of the control member 130.

The ball indexer is configured to mark a plurality of stable indexing positions of the control member 130 which is capable of moving in rotation about the axis of revolution X-X.

The ball indexer cooperates with a plurality of housings 155 provided at the radially external surface of the cylindrical body 110, more particularly at the head 112 of the body 110. The cylindrical body 110 comprises as many housings 155 as there are desired indexing positions.

In the example embodiment described, the indexing member 150 is configured to index four positions of the control member 130. Thus, the cylindrical body 110 has four housings 155 for example positioned at 90° to one another at the radially external surface of the periphery of the head 112. The four indexing positions of the control member 130 advantageously correspond to the four positions of the post 123 allowing for the operations described hereinabove, i.e.:

- a first angular position to activate the first function corrector 10 (as shown in FIG. 1);
- a second angular position to activate the second function corrector 12;
- a third angular position to simultaneously activate the first function corrector 10 and the second function corrector 12;
- a fourth angular uncoupling position for activating neither of the function correctors when the control member 130 is pressed.

It goes without saying that the indexing positions and the number of indexing positions are given as examples. Other alternatives can also be considered. A simpler alternative embodiment can be mentioned for example, consisting of indexing only the first position and the second position to activate either the first function corrector or the second function corrector.

Another alternative embodiment can also be to index the first position, the second position and the third position.

When the control member 130 is in position, the user operates the control member 130 by pressing in a direction indicated by the arrow referenced F1 in FIG. 1, parallel to the axis X-X.

The press exerted works against the return element 140, displacing the control member 130 and the control stem 120 towards the interior of the case 2 until the post 123 comes into contact with the one or more selected function correctors 10, 12. A further press on the control member 130 allows the one or more function correctors 10, 12 to be adjusted to allow a piece of information derived from the current time associated therewith to be activated, selected, reset or corrected.

The multifunction correction device 100 further comprises a sealing member 160 for producing a seal between the cylindrical body 110 and the control stem 120. The sealing member is, for example, formed by one or two O-rings superimposed on one another.

The sealing member 160 is configured to provide the required seal between the interior of the watch case 2 and the exterior of the watch case 2 while allowing the control stem 120 and the control member 130 to move in translation and rotation.

Figure 3:
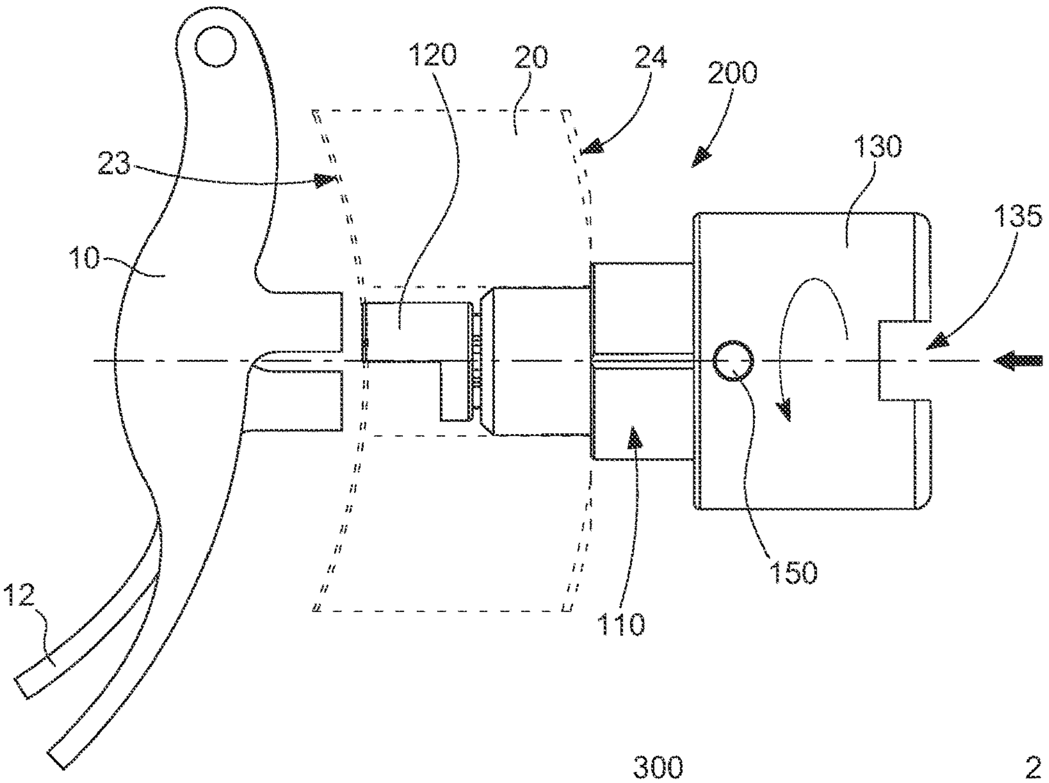
FIG. 3 shows a sagittal sectional view of a second example embodiment of the multifunction correction device according to the invention.

FIG. 3 shows a second example embodiment of a multifunction correction device according to the invention.

With reference to FIG. 3, the multifunction correction device 200 is identical to the multifunction correction device 100 described hereinabove except as regards the features that will be described hereinbelow.

In this second example embodiment, the control member 130 is a push-piece comprising a recess 135 intended to receive a tool to facilitate the rotation of the control member 130. It goes without saying that the tool has a shape that complements that of the recess 135.

Figure 4:
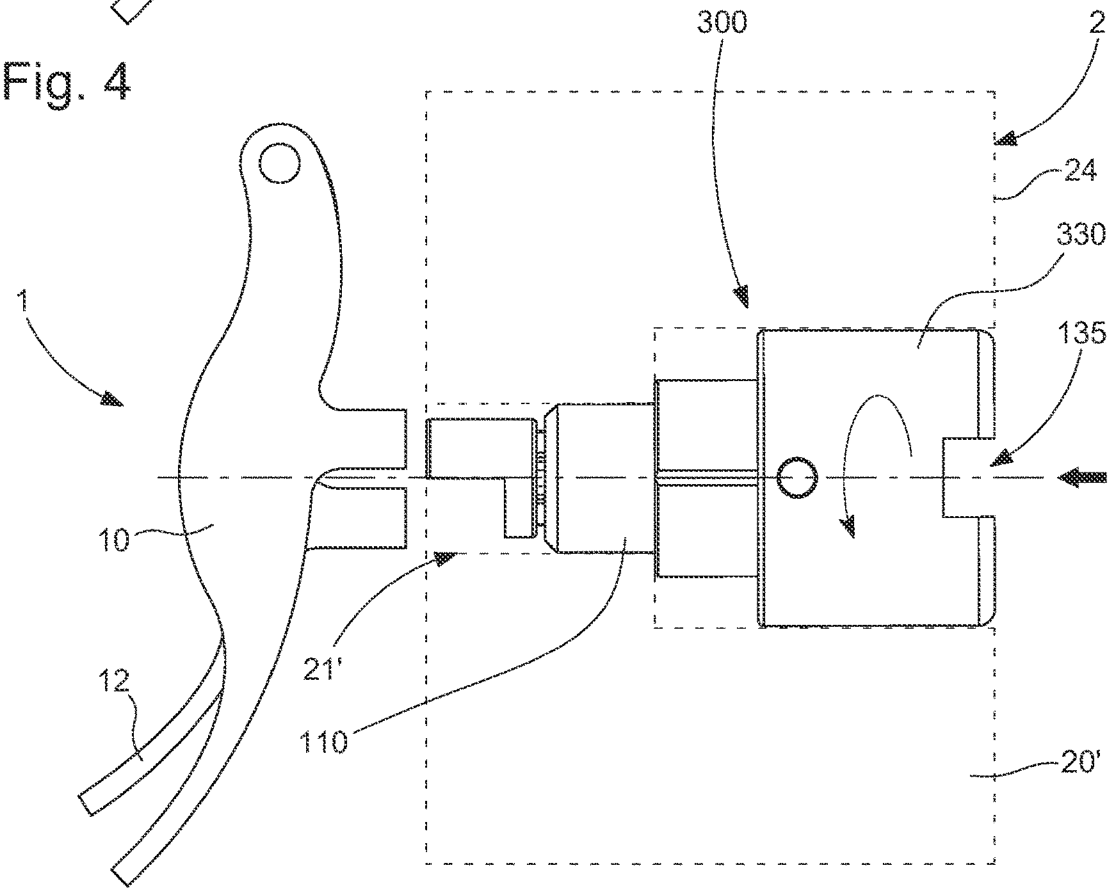
FIG. 4 shows a third example embodiment of a multifunction correction device according to the invention.

FIG. 4 shows a third example embodiment of a multifunction correction device according to the invention.

With reference to FIG. 4, the multifunction correction device 300 is identical to the multifunction correction device 100 described hereinabove except as regards the features that will be described hereinbelow.

In this third example embodiment, the multifunction correction device 300 is of the miniature multifunction corrector button type intended to be fully integrated into a middle 20' of the watch case 2. With reference to FIG. 3, the middle 20 is shown transparently so that the multifunction correction device 300 can be viewed as a whole.

The middle 20' comprises a through-housing 21' configured to receive the cylindrical body 110 by screwing or driving in.

In this example embodiment, the control member 130 is a miniature corrector housed in the housing 21' such that it does not protrude from the outer face 24 of the middle 20'.

The control member 330 comprises a recess 135 intended to receive a tool to allow for the rotation of the control member 130 which is housed in the middle 20' and thus not easily accessible to the user.

The control member 330 of this third example embodiment works in the same way as the control member 130 described with reference to FIGS. 1 to 2 and has the same features.

The control member 330 can be operated by the user from outside the case 2 by using a small tool configured to cooperate with the shape of the recess 135.

The invention has been described in the various example embodiments in particular for selecting and/or activating two function correctors comprised in a horological movement. However, the invention is also applicable to the selection and/or activation of a plurality of function correctors of a horological movement.

For this purpose, the second end 122 of the control stem 120 can comprise one or more posts, or protruding elements, of various shapes, to allow a plurality of fingers activating a plurality of function correctors to be activated.

For example, with a square, off-centre post, and by turning the control element by quarter turns, four function correctors of a horological movement can be activated.

In the present application, the control stem 120 operates two lever-type function correctors of a mechanical horological movement. However, the control stem could be considered such that it interacts with a function corrector of the electrical contact type procuring a function for displaying, correcting, selecting, engaging or resetting at least one function derived from the current time of any mechanism.

The invention further relates to a timepiece, such as a wristwatch, comprising a case 2 enclosing a horological movement 1 comprising at least two function correctors 10, 20 for displaying, correcting, selecting, engaging or resetting functions derived from the current time, such as a date, a time zone, or a chronograph, etc., and a multifunction correction device 100 according to the invention allowing a function corrector 10, 12 of the horological movement 1 to be selected and operated when the control member 130, 330 is pressed.

The case 2 comprises a middle comprising a housing 21 in which a multifunction correction device 100, 200, 300 according to the invention is mounted by driving in or screwing.

The invention claimed is:

1. A multifunction correction device (100, 200, 300) for a case (2) of a timepiece comprising a horological movement (1) having at least one function corrector (10, 12) for carrying out various functions of activating, selecting, resetting and/or correcting a piece of information derived from a current time of said horological movement (1), said multifunction correction device (100, 200, 300) comprising:

a cylindrical body (110) configured to be made integral with said timepiece case (2);

a control stem (120) with an axis of revolution (X-X), the control stem (120) being capable of moving in translation within the cylindrical body (110), along the axis of revolution (X-X) and having an end (122) comprising a protrusion (123) capable of interacting with said at least one function corrector (10, 12); and a control member (130, 330) integral with said control stem (120);

wherein the control member (130, 330) is capable of moving in rotation about the axis of revolution (X-X) of the control stem (120) between a plurality of angular positions and wherein the protrusion (123) is configured such that the rotation of the control member (130, 330) modifies the angular position of said protrusion (123) about the axis of revolution (X-X) and relative to the horological movement (1), and wherein for one of the angular positions (P3) of the control member (130, 330), the protrusion (123) of the end (122) of the control stem (120) is capable of being positioned facing a plurality of function correctors (10, 12) comprised in the horological movement (1), such that the correction device (100, 200, 300) is capable of simultaneously carrying out a combination of functions associated with the function correctors (10, 12) when the control member (130, 330) is pressed.

2. The multifunction correction device (100, 200, 300) according to claim 1, wherein for one of the angular positions of the control member (130, 330), the protrusion (123) of the end (122) of the control stem (120) is capable of being positioned facing a function corrector (10, 12) comprised in the horological movement (1), such that the correction device (100, 200, 300) is capable of carrying out a function associated with the function corrector (10, 12) when the control member (130, 330) is pressed.

3. The multifunction correction device (100, 200, 300) according to claim 1, wherein for one of the angular positions (P4) of the control member (130, 330), the protrusion (123) of the end (122) of the control stem (120) is inactive with respect to the horological movement (1) when the control member (130, 330) is pressed.

4. The multifunction correction device (100, 200, 300) according to claim 1, wherein the horological movement (1) comprises a first function corrector (10) and a second function corrector (12), wherein in a first angular position of the control member (130, 330), the protrusion (123) of the end (122) of the control stem (120) is able to be positioned facing the first function corrector (10) and wherein in a second angular position of the control member (130, 330), the protrusion (123) of the end (122) of the control stem (120) is able to be positioned facing the second function corrector (12), and wherein a press on the control member (130, 330) allows the protrusion (123) of said end (122) of the control stem (120) to be brought into contact with a selected function corrector (10, 12) in order to activate, select, reset or correct a function of an associated horological movement (1).

5. The multifunction correction device (100, 200, 300) according to claim 1, wherein the cylindrical body (110) has the shape of a cylinder of revolution with an axis of revolution (X-X).

6. The multifunction correction device (100, 200, 300) according to claim 1, wherein the control stem (120) is coaxial with the cylindrical body (110).

7. The multifunction correction device (100, 200) according to claim 1, wherein said multifunction correction device (100, 200) is a push button configured to be partially housed in a middle (20) of said case (2), and wherein the control member (130) is a push-piece.

8. The multifunction correction device (300) according to claim 1, wherein said multifunction correction device (300) is a corrector button configured to be fully integrated into a thickness of a middle (20') of said case (2).

9. The multifunction correction device (200, 300) according to claim 1, wherein the control member (130, 330) comprises a recess (135) configured to receive a tool having a shape that is complementary to that of the recess.

10. The multifunction correction device (100, 200, 300) according to claim 1, wherein said multifunction correction device (100, 200, 300) comprises a return member (140) provided between the cylindrical body (110) and the control member (130, 330) to ensure that the control member (130, 330) returns to a rest position.

11. The multifunction correction device (100, 200, 300) according to claim 1, wherein said protrusion (123) of said end (122) of the control stem (120) protrudes from a plane perpendicular to the axis of revolution (X-X).

12. The multifunction correction device (100, 200, 300) according to claim 1, wherein said protrusion (123) of said end (122) of the control stem (120) is a half-moon shaped post.

13. The timepiece comprising the case (2) enclosing the horological movement (1) comprising at least a first function corrector (10) and a second function corrector (12), each function corrector (10, 12) allowing a function derived from the current time to be displayed, corrected, selected, engaged or reset; said case (2) having a middle (20, 20') comprising a housing (21, 21') in which the multifunction correction device (100, 200, 300) according to claim 1 is mounted, said multifunction correction device (100, 200, 300) having the plurality of angular positions for interacting with the first function corrector (10) and/or the second function corrector (12) of the horological movement (1).

14. A multifunction correction device (100, 200, 300) for a case (2) of a timepiece comprising a horological movement (1) having at least one function corrector (10, 12) for carrying out various functions of activating, selecting, resetting and/or correcting a piece of information derived from a current time of said horological movement (1), said multifunction correction device (100, 200, 300) comprising:

- a cylindrical body (110) configured to be made integral with said timepiece case (2);
- a control stem (120) with an axis of revolution (X-X), the control stem (120) being capable of moving in translation within the cylindrical body (110), along the axis of revolution (X-X) and having an end (122) comprising a protrusion (123) capable of interacting with said at least one function corrector (10, 12); and
- a control member (130, 330) integral with said control stem (120);
- wherein the control member (130, 330) is capable of moving in rotation about the axis of revolution (X-X) of the control stem (120) between a plurality of angular positions and wherein the protrusion (123) is configured such that the rotation of the control member (130, 330) modifies the angular position of said protrusion (123) about the axis of revolution (X-X) and relative to the horological movement (1),
- wherein the multifunction correction device further comprises an indexing member (150) for indexing said plurality of angular positions of the control member (130, 330).

15. The multifunction correction device (100, 200, 300) according to claim 14, wherein the indexing member (150) is formed by an indexer comprising an indexing ball (151) housed in an indexing frame (152) carried by the control member (130, 330).

16. The multifunction correction device (100, 200, 300) according to claim 15, wherein said indexer cooperates with housings (155) made in the cylindrical body (110).

17. A multifunction correction device (100, 200, 300) for a case (2) of a timepiece comprising a horological movement (1) having at least one function corrector (10, 12) for carrying out various functions of activating, selecting, resetting and/or correcting a piece of information derived from a current time of said horological movement (1), said multifunction correction device (100, 200, 300) comprising:

- a cylindrical body (110) configured to be made integral with said timepiece case (2);
- a control stem (120) with an axis of revolution (X-X), the control stem (120) being capable of moving in translation within the cylindrical body (110), along the axis of revolution (X-X) and having an end (122) comprising a protrusion (123) capable of interacting with said at least one function corrector (10, 12); and
- a control member (130, 330) integral with said control stem (120);
- wherein the control member (130, 330) is capable of moving in rotation about the axis of revolution (X-X) of the control stem (120) between a plurality of angular positions and wherein the protrusion (123) is configured such that the rotation of the control member (130, 330) modifies the angular position of said protrusion (123) about the axis of revolution (X-X) and relative to the horological movement (1), and
- wherein for one of the angular positions (P4) of the control member (130, 330), the protrusion (123) of the end (122) of the control stem (120) is inactive with respect to the horological movement (1) when the control member (130, 330) is pressed.

* * * * *